UNITED STATES PATENT OFFICE.

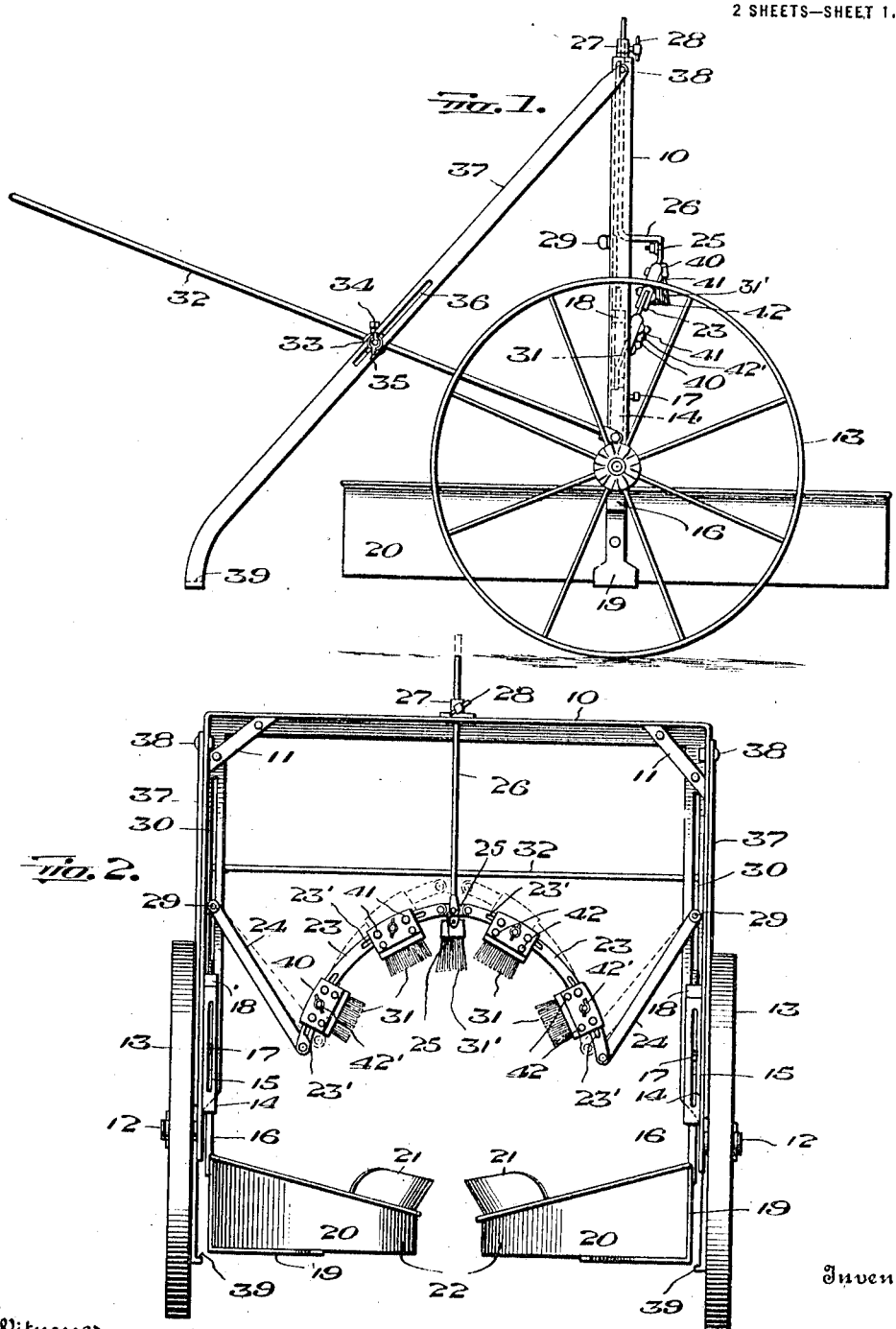

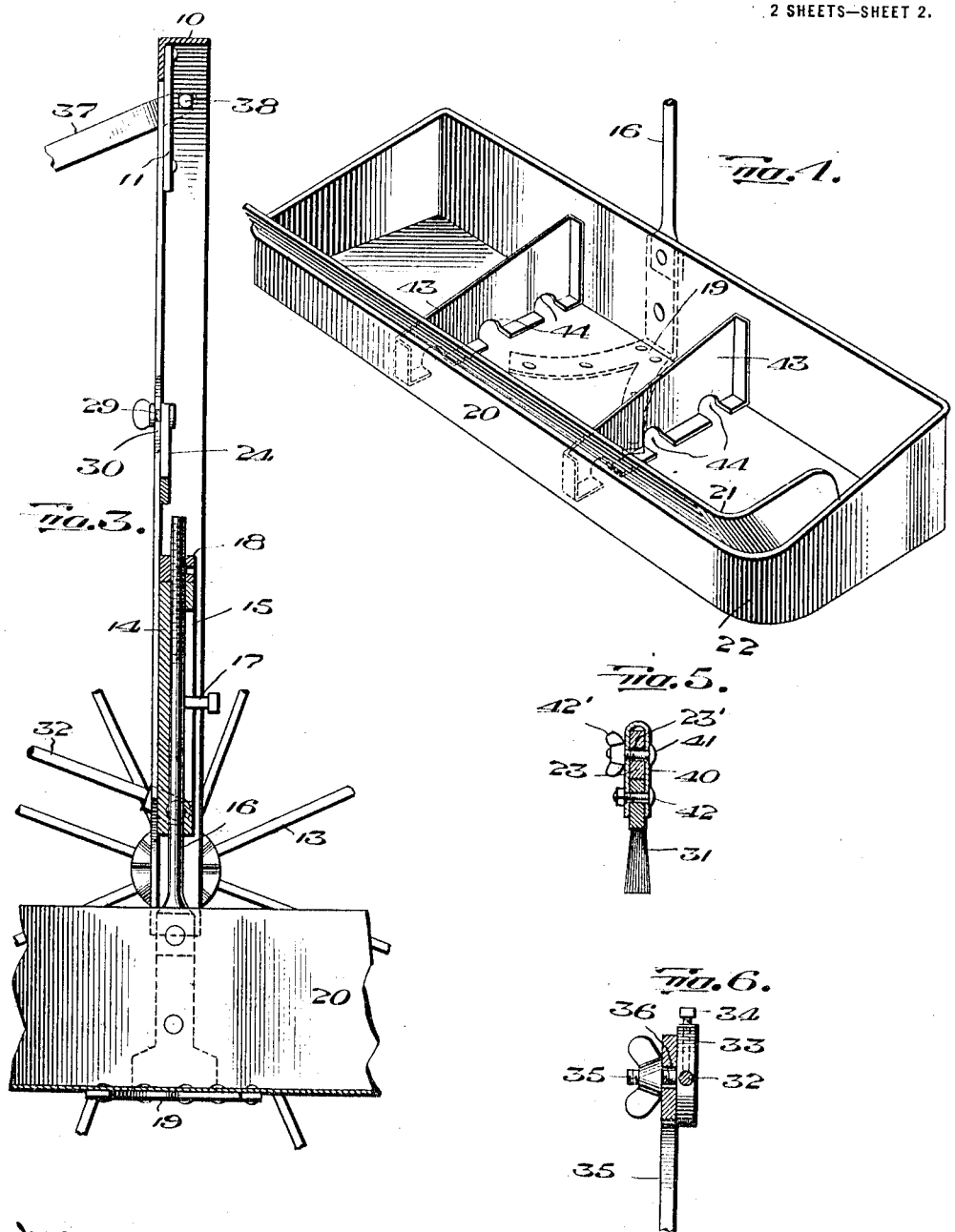

WILLIAM W. FULLER, OF WEST POINT, GEORGIA.

BOLL-WEEVIL DESTROYER.

1,241,727.  Specification of Letters Patent.  Patented Oct. 2, 1917.

Application filed May 23, 1917.  Serial No. 170,336.

*To all whom it may concern:*

Be it known that I, WILLIAM W. FULLER, a citizen of the United States, residing at West Point, in the county of Troup and State of Georgia, have invented certain new and useful Improvements in Boll-Weevil Destroyers; and I do hereby declare the following to be a full, clear, and exact description of the invention, such as will enable others skilled in the art to which it appertains to make and use the same.

The present invention relates to a boll-weevil destroyer, and has for an object to provide a machine for operation upon cotton, and like plants, for removing and collecting therefrom boll weevil, potato bugs, other insects, punctured and dead squares, and the like.

Other objects are to provide an economically and simply constructed machine of this character which has relatively few parts, is light in weight, may be easily manipulated, which is provided with collecting pans constructed to retain the insects and dead squares from falling out and to maintain the bottoms of the pans entirely covered with the kerosene oil and other liquids used, which prevents injury to the stalks and blooms, produces a gentle brushing action on all parts of the plant to thoroughly cleanse the same, and which may be adjusted to plants of various heights and breadths.

The above, and various other objects and advantages of this invention will be in part described, and in part understood, from the following detailed description of the present preferred embodiment, the same being illustrated in the accompanying drawings wherein:

Figure 1 is a side elevation of a boll weevil destroyer constructed according to the present invention.

Fig. 2 is a front elevation of the same.

Fig. 3 is a fragmentary enlarged view in section taken vertically through one side of the frame, showing the adjustable pan support and a portion of the adjustable brush frame.

Fig. 4 is a detail perspective view of one of the pans.

Fig. 5 is a transverse section taken through a portion of the brush frame and one of the brushes applied thereto.

Fig. 6 is a transverse section through the handle and one of the adjustable legs, showing the adjustable connection between the same.

Referring to this drawing, the main frame of the machine comprises an angle-iron arched bar 10 reinforced at its upper corners by diagonal bracing straps 11, and having one of its flanges extending inwardly at its top and sides.

The lower ends of the arched bar 10 have transversely alined spindles 12 which support wheels 13. The wheels 13 are relatively large and are of open construction, and preferably have relatively few spokes so as not to injure the branches of plants against which the wheels may come in contact. The arched bar 10 is provided at each side, and in the angle thereof with a vertically extending socket 14 which may be tubular, and provided with an axial opening extending throughout its entire length. Each socket 14 is provided with a longitudinal slot 15 in preferably its forward side, and which terminates short of the upper and lower ends of the socket. Hangers 16, in the form of rods, project upwardly through the sockets 14 and are provided upon one side with outwardly extending pins 17 slidable in the slots 15, and adapted to bear against the marginal edges of the slots to limit the hangers 16 from turning in the sockets. The hangers 16 are threaded at their upper ends for a considerable length, and are provided with supporting nuts 18 upon their upper ends adapted to bear upon the upper ends of the sockets 14 to hold the hangers 16 from sliding downwardly through the sockets.

The lower end of each hanger is provided with a bracket 19 which is substantially of rectangular formation, and which has one portion rigidly attached to the lower end of the hanger rod 16, and the opposite portion bifurcated and diverged for engagement against the underside of a pan 20 which is mounted upon the bracket. The arms or diverging portions of the bracket 19 are riveted or otherwise permanently secured to the bottom of the pan 20, and the upstanding portion of the bracket 19 bears against the outer side of the pan 20 to brace the same. The hangers 16 with their brackets 19 constitute the sole support for the pans, and the latter are adapted to vibrate slightly upon the lower ends of the rods 16.

As shown in Fig. 2, the inner sides of the pan 20 are spaced apart sufficiently to form a passage or channel through the machine for the reception of stalks, and the like, over which the machine is adapted to be operated. To prevent injury to the stalks the pans 20 have at their upper edges and inner sides flexible aprons 21, of leather or the like, which are inclined upwardly and inwardly toward each other to contract the passage between the pans, and to catch and throw into the pans insects, and the like, which are dropped from the plants passing through the machine.

The forward inner corners of the pans 20 are rounded, as at 22, to form a flared throat to receive the stalks and direct the same into the passage between the pans.

Arranged over the pans 20, intermediate the front and rear ends thereof, is a brush frame in the form of a pair of arcuate bars 23 pivotally connected at their lower ends to links 24, and pivotally secured at their upper ends to a cross head 25 carried upon the lower end and an adjusting rod 26. The rod 26 is slidable through the upper portion of the arched bar 10, and through a socket 27 carried by the bar 10, the latter having a binding screw 28 for engagement with the rod 26 to secure the latter in various elevated positions. The links 24 are provided, at opposite ends, with threaded openings adapted to receive the ends of thumb screws 29, which latter pass through longitudinal slots 30 formed in the inwardly extending flanges at the sides of the main frame or bar 10. The thumb screws 29, when loosened, are adapted to be raised and lowered in the frame 10 to move the lower ends of the arcuate bars 23 toward and from each other, and are adapted to be clamped when the desired position is obtained for securely holding the links in position. The arcuate bars 23 are each provided with a pair of brushes 31 which extend inwardly of the brush frame and are adapted to wipe against the plants over which the machine is passed.

A handle or bail 32 is pivotally mounted at its free ends to the lower ends of the arched bar or frame 10, and is adapted to extend rearwardly from the frame, and to be grasped by the operator for pushing the machine. The opposite sides of the handle 32 are provided thereon with shiftable blocks 33 held in adjusted position with set screws 34, the blocks having at their outer sides thumb screws 35 adapted to engage in longitudinally extending slots 36 formed intermediate the ends of legs or braces 37 carried by the frame 10. The braces 37 may be in the form of flat bars pivotally mounted on pins 38 at their upper ends to the sides of the frame 10, near the top of the latter. The lower ends of the legs 37 are preferably curved downwardly and are bent thereat abruptly inward to form feet 39 for engagement with the ground to support the machine when at rest, and also to provide a fulcrum support for elevating the forward ends of the pans 20 by depressing the handle 32, to avoid stones and the like about which the pans cannot pass.

The shiftable block 33 serves the purpose of connecting the handle 32 to the braces 37 at various adjustments of the same relatively to each other so that the handle 32 may be retained at the desired height to lift the feet 39 from the ground when the handle 32 is grasped. Preferably, the vertically adjustable rod 26 which supports the brush frame is bent forwardly at its lower end to advance the brushes 31 forwardly of the main frame and thus insure the vibration of the plants as they pass between the pans 20.

The brushes 31 are mounted upon straps 40 which encircle the bars 23, and which may be anchored thereon by bolts 41, the latter passing freely through slots 23′ extending longitudinally in the bars 23. The straps 40 are secured to the brushes 31 by bolts 42 or the like, and winged nuts 42′ are preferably carried upon the straps 40 and engaged through the slot portions of the bars 23, and are adapted to be tightened upon their respective bolts to bind the sleeves 40 in adjusted position.

By this construction the brushes may be independently adjusted longitudinally of the bars 23 to raise and lower the brushes for contact with plants of various dimensions. The cross-head 25 which connects the upper ends of the bars 23 carries a relatively long stationary brush 31′ which projects downwardly beyond the lateral brushes 31, and which is adapted to sweep across the tops of the plants. The flexible aprons 21 converge inwardly at any desired angle, preferably at an angle 45° so as to substantially close the passage between the pans 20 and insure the catching of the insects and other accumulations brushed from the plants.

Each pan 20 has its upper edge sloping downwardly and inwardly of the pan so that the pans are relatively shallow at their inner sides and relatively deep at their outer sides. Transverse partitions 43 are arranged at suitable intervals within the pans 20 and have apertures 44 in the lower edges thereof intercommunicating the compartments of each pan.

In operation, the pans 20 are adjusted to the desired height for passage over the hills, and at the opposite sides of a row of stalks or plants. By turning the supporting nuts 18 in the desired direction the hangers 16 may be raised or lowered to support the pans at the desired height above the ground. The hangers 16, with the pans 20, are held from turning in the frame by the pins 17 which bind in the longitudinal slots of the sockets 14. The brush frame is now adjusted by raising the rod 26 to bring the brushes 31 into suitable sweeping contact with the upper ends or tops of the plants, and the links 24 are adjusted at their outer ends by the movement of the thumb screws 29 in the slots 30 of the frame to move the lower pair of brushes 31 into the desired brushing contact with the sides of the plant. The block 33 is adjusted to support the handle 32 at the desired height when at rest, and to lift the feet 39 from the ground when the handle is raised into a natural position for walking.

As the machine is pushed over the rows of plants, the stalks of the plants pass through the throat of the machine between the pans 20, and the flexible aprons 21 engage the plants and prevent cutting or undue jarring of the stalks by the spaced walls of the throat. The brushes wipe across the leaves or branches of the plants and vibrate the plants sufficiently only to dislodge boll weevil, other insects, dead squares, and the like from the plants by exerting a light sweeping action upon the plants which does not injure the same.

It is, of course, understood that the above is but one embodiment of the present invention, and that various changes and modifications may be made in the details of construction and design thereof without departing from the spirit of the invention.

What I claim is:—

1. In a boll weevil destroyer, the combination with a frame adapted to be passed over rows of plants, of catching pans suspended from the frame in the opposite sides thereof, and vibrating means including a sectional arched brush frame and brushes therein, said brush frame being adjustably suspended at its intermediate portion from the top of the main frame and being adjustably connected at its ends to the sides of the main frame for applying the brushes to plants of various sizes.

2. In a boll weevil destroyer, the combination of a main frame adapted to be passed over a row of plants, of catching means supported in the lower opposite sides of the frame, a sectional, hingedly-connected brush frame adjustably mounted in the main frame at the opposite sides thereof and adapted to be advanced toward and from the opposite sides of plants passing through the main frame, and supporting means adjustably connecting the brush frame to the main frame for raising and lowering the brush frame.

3. In a boll weevil destroyer, the combination of a main frame adapted to straddle a row of plants, collecting means carried in the lower opposite sides of the main frame, a vertically adjustable rod carried intermediately in the main frame, a pair of bars hinged to the lower end of the rod, a pair of links hingedly connecting the free ends of said bars to the main frame and having adjustable connections with the latter, and a plurality of brushes mounted upon said bars for movement therewith into adjustment against the sides of plants varying in size.

4. In a boll weevil destroyer, the combination of an arched frame, a pair of collecting pans mounted for vertical adjustment in the opposite sides of the frame, a two-part brush frame arranged in the main frame over said pans and having pairs of brushes extending inwardly toward one another, adjustable means connecting the lower ends of the brush frame to the sides of the main frame and adapted to open and contract the brush frame against plants of various thicknesses, and suspending means carried by the main frame and having connection with the top of the brush frame for raising and lowering the latter to accommodate plants of various heights.

5. In a boll weevil destroyer, the combination of an arched frame adapted to straddle a row of plants, collectors supported in the lower opposite sides of the arched frame, an adjustable brush frame arranged in the upper end of the arched frame over said collectors, links adjustably connecting the sides of the brush frame to the sides of the arched frame, and a vertically adjustable rod mounted in the upper end of the arched frame and having connection at its lower end to the brush frame for supporting it, the lower end of said rod being offset forwardly to advance the brush frame forwardly from the transverse plane of the arched frame.

In testimony whereof I affix my signature in presence of two witnesses.

WILLIAM W. FULLER.

Witnesses:
　W. C. LANIER,
　R. H. HODNETT.

Copies of this patent may be obtained for five cents each, by addressing the "Commissioner of Patents, Washington, D. C."